2,745,727

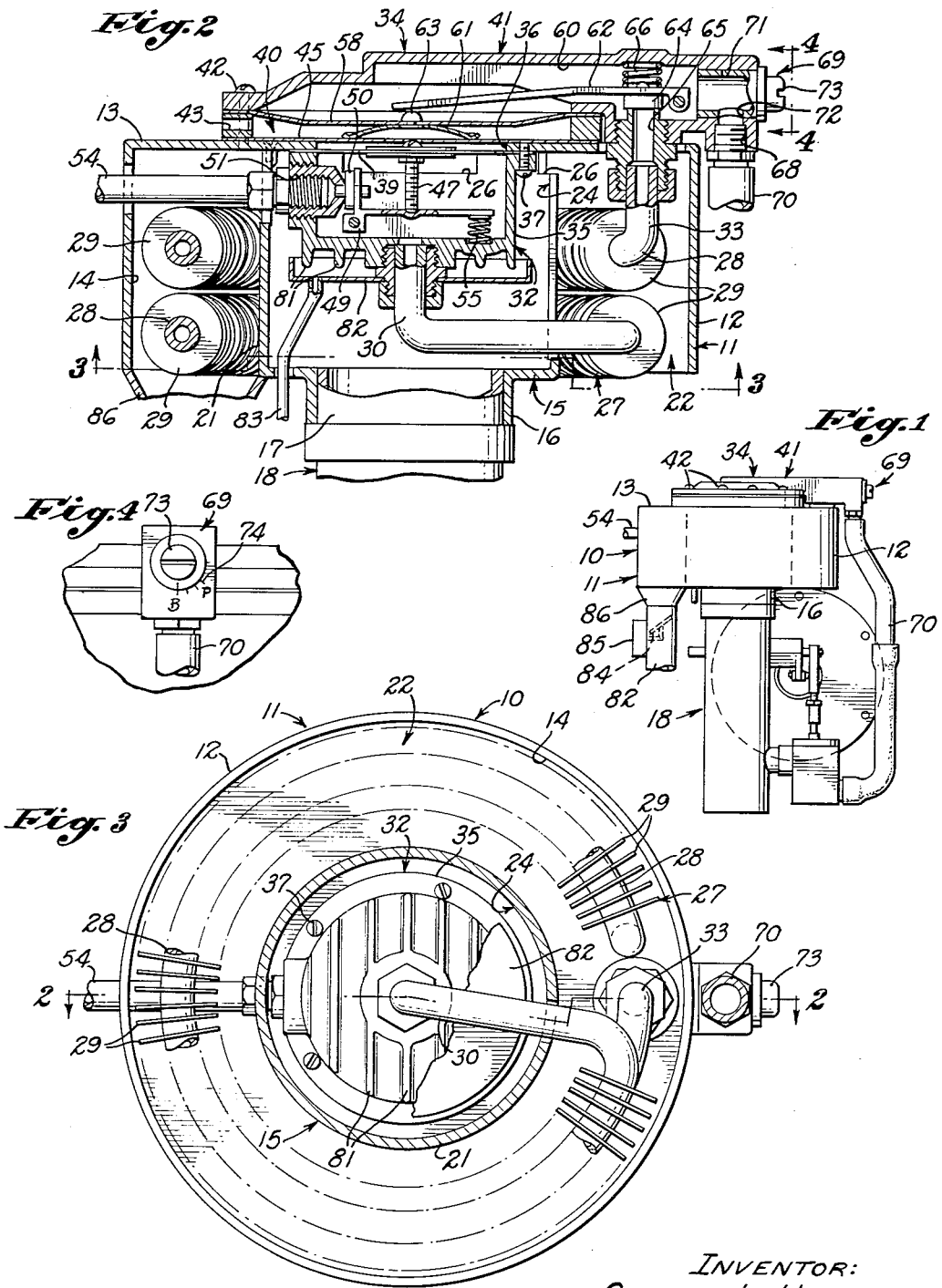
May 15, 1956 — G. L. HOLZAPFEL — 2,745,727
HEAT EXCHANGE APPARATUS FOR LIQUEFIED FUEL CARBURETORS
Filed March 31, 1951
INVENTOR:
GEORGE L. HOLZAPFEL
BY HIS ATTORNEYS
HARRIS, KIECH, FOSTER & HARRIS United States Patent Office 2,745,727
Patented May 15, 1956

HEAT EXCHANGE APPARATUS FOR LIQUEFIED FUEL CARBURETORS

George L. Holzapfel, Los Angeles, Calif.

Application March 31, 1951, Serial No. 218,675

10 Claims. (Cl. 48—184)

This invention relates to a heat exchange apparatus for liquefied fuel carburetors which is designed to vaporize liquefied gaseous fuel and to substantially reduce the temperature of combustion air introduced into a liquefied fuel carburetor having the heat exchange apparatus associated therewith.

Conventional liquefied fuel carburetors designed for introducing propane or butane into an internal combustion engine usually incorporate passages for introducing heated fluid from the cooling system about the fuel passages of the carburetors to insure that sufficient heat will be supplied to the propane or butane to accomplish vaporization of the liquefied gaseous fuel by providing the latent heat of vaporization. Among the disadvantages of such conventional carburetors are the necessity for providing connections to the cooling system of the engine, improper functioning of the carburetor when the coolant is not maintained at a regulated temperature and the necessity for the provision of a relatively complex pressure regulator system provided with passages for the flow of heating fluid therethrough.

It is, therefore, a primary objected of my invention to provide a heat exchange apparatus for liquefied gas carburetors which relies upon the ambient air to provide the latent heat of vaporization necessary to volatilize the liquid gaseous fuel passing into the carburetor with which the heat exchange apparatus is associated.

An additional object of my invention is the provision of a heat exchange apparatus for liquefied gaseous fuel carburetors which includes an air intake passage communicating with the ambient air and an air outlet passage disposed in communication with the carburetor with which the heat exchange apparatus is associated, said air intake passage having mounted therein a heat exchanger through which the liquefied gaseous fuel is adapted to flow.

A further object of my invention is the provision of a heat exchange apparatus of the aforementioned type in which sufficient heat is extracted from the ambient air as it passes over the aforesaid heat exchanger to substantially reduce the temperature of the ambient air before it enters the carburetor. Therefore, the temperatures of the air and fuel entering hte engine are caused to approach each other providing more exact air-fuel mixtures and causing more economical fuel consumption.

Another object of my invention is the provision of a heat exchange apparatus for a liquefied gaseous fuel carburetor which includes a first pressure reducing valve disposed in the housing of the heat exchange apparatus and exposed to the flow of combustion air therethrough. An associated object of my invention is the provision of a first pressure reducing valve which has incorporated therein heat exchange means adapted to absorb additional heat from the ambient air as it passes through the heat exchange apparatus subsequently or previously to its passage over the heat exchanger to further reduce the temperature of the combustion air and to insure the volatilization of the liquefied gaseous fuel as it passes through the first pressure reducing valve.

An additional object of my invention is the provision of a heat exchange apparatus which includes a housing having an air inlet passage communicating with the ambient air and an air outlet passage communicating with a carburetor air inlet associated with the heat exchange apparatus, said air outlet passage having disposed therein a first pressure reducing valve and said air inlet passage having disposed therein a heat exchanger, said first pressure reducing valve and said heat exchanger extracting heat energy from the ambient air flowing through said outlet and inlet passages, respectively, to insure the volatilization of liquefied gaseous fuel passing through said heat exchanger.

An additional object of my invention is the provision of a heat exchanger of the aforementioned type which includes a second pressure reducing valve operatively associated with said first pressure reducing valve, the aforesaid heat exchanger being connected between said first and second pressure reducing valves.

An additional object of my invention is the provision of a heat exchanger of the aforementioned type in which said first and second pressure reducing values communicate with a common atmospheric chamber and are mounted in contiguity to each other.

Another object of my invention is the provision of a heat exchange apparatus of the aforementioned type which incorporates a variable orifice adapted to control the pressure of the fuel passing from the heat exchange apparatus in accordance with the type of fuel mixture passing through the heat exchange apparatus.

An additional object of my invention is the provision of a heat exchange apparatus of the aforementioned type which is of relatively small size, simple of construction and readily mounted upon liquefied gaseous fuel carburetors.

Other objects and advantages of my invention will be apparent from the following specification and the accompanying drawing, which is for the purpose of illustration only, and in which:

Fig. 1 is a view showing a heat exchanger constructed in accordance with my invention associated with a liquefied fuel carburetor;

Fig. 2 is a vertical, partly sectional view taken on the broken line 2—2 of Fig. 3;

Fig. 3 is a bottom plan view taken from the broken line 3—3 of Fig. 2; and

Fig. 4 is a fragmentary elevational view taken from the broken line 4—4 of Fig. 2.

Referring to the drawing, and particularly to Fig. 1 thereof, I show a heat exchanger 10 constructed in accordance with my invention and including a substantially cylindrical housing 11 which is provided with a vertical, peripheral wall 12 which is capped by a top wall 13.

The peripheral wall 12 and the top wall 13 enclose a bottomless chamber 14 in which is centrally disposed a baffle 15, said baffle being substantially cylindrical in configuration and having its top edge secured to the central portion of the top wall 14 by means of screws or similar fasteners. The lowermost portion of the baffle 15 is provided with an integral neck 16 which is adapted to encompass the reduced upper end 17 of a gas carburetor or mixer 18.

The baffle 15 has a vertical wall 21 which is spaced from the vertical wall 12 of the housing 11 to define an air inlet passage 22. The interior of the baffle 15 constitutes an air outlet passage 24 which is disposed in substantial parallelism with the air inlet passage 22 and which is adapted to be maintained in communication therewith by means of castellations 26 provided in the upper edge of the baffle 15.

Disposed in the air inlet passage 22 and having its convolutions encompassing the periphery of the baffle 15 is a heat exchanger coil 27 which is constituted by a tubular core 28 upon the periphery of which is mounted a plurality of spaced, heat exchange discs 29. Secured to the inlet end 30 of the heat exchange coil 27 is a first, pressure reducing valve 32 while the outlet end 33 of the heat exchange coil 27 communicates with a second pressure reducing valve 34.

The first pressure reducing valve 32 includes a body 35 which is secured adjacent a centrally located opening 36 in the top wall 13 of the housing 11 by means of screws 37, or similar fasteners. A diaphragm 39 spans the open end of the body 35 and the centrally located opening 36 in the top wall 13 of the housing 11 and is supported between the contiguous surfaces on the under side of the top wall 13 and the upper edge of the body 35 and is maintained there by means of the screws 37.

An atmospheric chamber 40 is provided in a body 41 secured to the upper surface of the top wall 13 by means of screws 42. The atmospheric chamber 40 communicates with the atmosphere by means of a lateral passage 43 formed in the body 41. A strip spring 45 extends across the centrally located opening 36 in the top wall 13 and is secured across said opening by its location between the surface on the bottom edge of the body 41 and the surface of the top wall 13. The head of a contact screw 47 engages the under side of the central portion of the strip spring 45 and has its lower end maintained in contact with a bellcrank 49, said bellcrank having a shut-off valve 50 mounted on one arm thereof adapted to close an inlet orifice 51 into the body 35 which communicates with a supply of liquefied fuel through a supply tubing 54. A compression spring 55 engages the under side of the other arm of the bellcrank 49 and tends to bias the shut-off valve 50 into shut-off position with reference to the inlet orifice 51.

The second pressure reducing valve 34 is located in the body 41 and includes a diaphragm 58 which has one side disposed in communication with the atmospheric chamber 40 and the other side disposed in communication with the interior of a partial vacuum chamber 60. A bow spring 61 is located centrally of the diaphragm 58 and has its terminal ends supported upon the strip spring 45. Located in the partial vacuum chamber 60 of the second pressure reducing valve 34 is a lever 62 which is pivotally mounted in said chamber and has a free end engageable by a boss 63 mounted centrally of the diaphragm 58. Secured to the lever 62 adjacent its pivoted end is a valve 64 which controls the flow of gas from the heat exchange coil 27 through a fuel inlet opening 65 into the second pressure reducing valve 34 and, more particularly, into the partial vacuum chamber 60 thereof. A compression spring 66 biases the lever 62 in a direction which causes the valve 64 to assume the fuel shut-off position with respect to the fuel inlet orifice 65 of the second pressure reducing valve 34. The second pressure reducing valve 34 is provided with a fuel outlet opening 68 and has associated therewith a variable orifice 69 adapted to control the flow of gas flowing from the second pressure reducing valve into a line 70 which communicates with the carburetor 18.

The variable orifice 69 includes a barrel type valve 71 which has an orifice 72 formed therein adapted to register with the fuel outlet orifice 68 of the second pressure reducing valve 34. The positioning of the barrel valve 71 and the orifice 72 thereof with respect to the fuel outlet orifice 68 of the second pressure reducing valve 34 is controlled by means of a setting screw 73, said setting screw 73 having indicia 74 associated therewith adapted to provide a reference by which the position of the barrel valve 71 may be set.

When the engine, not shown, associated with the carburetor 18 is started a partial vacuum is created in the partial vacuum chamber 60 of the second pressure reducing valve 34, said partial vacuum being communicated to said chamber by means of the line 70 and causing upward movement of the diaphragm 58 of the second pressure reducing valve 34. Such upward movement of the diaphragm 58 causes the simultaneous upward movement of the boss 63 mounted thereupon which is thus carried into engagement with the free end of the lever 62, causing the lever to move upwardly against the bias of the compression spring 66 and moving the valve 64 out of engagement with the fuel inlet orifice 65 of the second pressure reducing valve 34. The spring 66 is so calculated that, while it will maintain the valve 64 in seating relationship with the orifice 65 when no vacuum is induced in the partial vacuum chamber 60, the slightest induced partial vacuum accompanied by the upward movement of the boss 63 will permit the valve 64 to be unseated to permit the flow of liquefied gaseous fuel into the partial vacuum chamber 60.

Simultaneously with the opening of the valve 64, the partial vacuum in the partial vacuum chamber 60 is communicated through the heat exchanger coil 27 to the chamber of the first pressure reducing valve 32. The partial vacuum thus induced causes downward movement of the diaphragm 39 which concomitantly carries the contact screw 47 downwardly to shift the bellcrank 49 and open the shut-off valve 50, permitting fuel to flow from the supply tubing 54 into the first pressure reducing valve 32, through the heat exchange coil 27 into the second pressure reducing valve 34 and then into the line 70 to the carburetor 18.

When the engine, not shown, associated with the carburetor 18 is started, ambient air is drawn upwardly through the air inlet passage 22 past the heat exchange coil 27. During the passage of the ambient air over the heat exchange coil 27 the latent heat of vaporization of the fuel is extracted from the air in the air inlet passage to convert the liquefied gaseous fuel back to the vapor phase. The cooled ambient air is then drawn through the castellations 26 on the upper end of the baffle 15 and flows downwardly through the air outlet passage 24 defined by the vertical wall 21 of the baffle 15. As the air passes the body 35 it contacts heat exchange fins 81 formed upon the under side thereof so that additional heat may be extracted from the air flowing through the outlet passage and to insure that complete vaporization of the liquefied gaseous fuel will occur before the fuel leaves the chamber of the first pressure reducing valve 32. Supported adjacent the under side of the body 35 and the heat exchange fins 81 provided thereupon is a drip pan 82 which is adapted to collect condensate accumulating on the heat exchange fins 81 and which is drained by a tubing 83 connected to the under side thereof. It should be noted here that the heat exchange coil, and more particularly the fins thereof, serves as an air cleaner for the ambient air drawn into the air inlet passage 22 since there is a considerable deposit of condensate thereupon which tends to entrain dust and other particles embodied in the ambient air drawn into the air inlet passage. This is an important feature of my invention since it permits the conventional air cleaner to be dispensed with. The cooled air, after its exposure to the heat exchange fins 81 of the body 35 is then drawn into the air intake passage of the carburetor for ultimate mixture with the vaporized fuel passing into said carburetor through the line 70.

Among the major advantages derived from the utilization of my invention is the fact that the heat transfer of the latent heat of vaporization from the ambient air utilized in combustion not only causes the complete and efficient vaporization of the liquefied gaseous fuel but also serves to substantially reduce the temperature of the combustion air. Since the temperature of the air is substantially reduced a larger quantity of air can be fed into the cylinders and the power of the engine is increased proportionately. This is clearly indicated by the following computation:

Latent heat of vaporization of butane, 170 B. t. u./lb.
Air required for combustion of 1 lb., 15.5 lb.
Specific heat of air, .24.
Heat required to change temperature of air 1° F., 15.5×.24 or 3.7 B. t. u.
Therefore 1 lb. of butane will change it 170÷3.7=46°.
Suppose air enters engine at 80° F.=540° Abs.
It will be cooled to 34° F.=494° Abs.
Then reduction of volume is 4600÷540=8.5%.

Thus, by the use of my invention a relatively large increase in the power output of the engine may be achieved, considerable fuel economy may be attained and complex heat exchange apparatus necessary in the utilization of conventional carburetors for liquefied gaseous fuel may be dispensed with.

If the ambient air temperature in which the engine, not shown, is operated is low it may be necessary to supply heated fluid to the air inlet passage 22 to impart sufficient heat to the ambient air to cause the heat exchange cycle to occur. Various means may be utilized to accomplish this desired end, there being shown in Figs. 1 and 2 of the drawing a nozzle 86 communicating with the air inlet passage 22 which is connected to a pipe 82 which is, in turn, connected to the exhaust manifold of the engine, not shown. Mounted in the pipe 82 is a valve 84 whose movement is controlled by an ambient air thermostat 85 which opens the valve 84 when the ambient air temperature is low and closes it when the ambient air temperature rises. Therefore, heated gases are supplied to the nozzle 86 so long as the ambient air temperature is low but are shut off when the ambient air temperature rises.

It is also within the concept of my invention to provide auxiliary heating means, such as a small gas burner, to heat the ambient air as it flows into the air inlet 22 until a supply of heated gas is available from the exhaust manifold.

Furthermore, the heat exchange apparatus of my invention embodies the pressure reducing valves necessary to reduce the pressure of the liquefied gaseous fuel to atmosphere, said valves being so constructed and disposed that the common atmospheric chamber is shared and a marked economy in the manufacture of the valves results accompanied by a material reduction in both the weight of the valves and the sizes thereof.

Also of value in my invention is the air cleaning function served by the heat exchange coil thereof which in some cases permits the conventional air cleaners utilized with previous heat exchange apparatus to be eliminated.

I claim as my invention:

1. In an apparatus for vaporizing liquefied fuel and mixing it with air, the combination of: a source of liquefied fuel; a housing having a combustion air inlet passage and a combustion air outlet passage communicating with each other, said combustion air inlet passage communicating with the ambient air surrounding said housing and said combustion air outlet passage communicating with the air intake of a carburetor; a pressure reducing valve mounted in said combustion air outlet passage above said air intake of said carburetor and communicating with a fuel inlet on said housing connected to said source; and a heat exchanger disposed in said combustion air inlet passage, said heat exchanger being connected intermediate said pressure reducing valve and a fuel outlet mounted on said housing and connected to said carburetor in spaced relation with the air intake thereof for reducing the temperature of said combustion air as it flows through said combustion air inlet passage and for supplying the latent heat of vaporization to said liquefied fuel as it flows through said heat exchanger.

2. In an apparatus for vaporizing liquefied fuel and mixing it with air, the combination of: a source of liquefied fuel under pressure; a housing having a combustion air inlet passage and a combustion air outlet passage communicating with each other, said combustion air inlet passage communicating with the ambient air surrounding said housing and said combustion air outlet passage communicating with the air intake of a carburetor; a first pressure reducing valve mounted in said combustion air outlet passage and communicating with a fuel inlet on said housing connected to said source; a second pressure reducing valve mounted on said housing in juxtaposition to said first valve and communicating with a fuel outlet on said housing connected to said carburetor below said air intake; and a heat exchanger disposed in said combustion air inlet passage, said heat exchanger being connected intermediate said first and second pressure reducing valves on said housing for reducing the temperature of said combustion air as it flows through said combustion air inlet passage and for supplying the latent heat of vaporization to said liquefied fuel as it flows through said heat exchanger.

3. In an apparatus for vaporizing liquefied fuel and mixing it with air, the combination of: a source of pressurized liquefied fuel; a housing having a combustion air inlet passage and a combustion air outlet passage communicating with each other, said combustion air inlet passage communicating with the ambient air surrounding said housing and said combustion air outlet passage communicating with the air intake of a carburetor; a first pressure reducing valve mounted in said combustion air outlet passage above said air intake and communicating with a fuel inlet on said housing connected to said source; a second pressure reducing valve mounted on said housing and communicating with a fuel outlet on said housing connected to said carburetor below said intake, said first and second reducing valves disposed on opposite sides of a common atmospheric chamber; and a heat exchanger disposed in said combustion air inlet passage, said heat exchanger being connected intermediate said first and second pressure reducing valves on said housing for reducing the temperature of said combustion air as it flows through said combustion air inlet passage and for supplying the latent heat of vaporization to said liquefied fuel as it flows through said heat exchanger.

4. In an apparatus for vaporizing liquefied fuel and mixing it with air, the combination of: a source of liquefied fuel; a vertically walled housing incorporating a chamber having a cylindrical baffle secured therein and spaced from the wall of said housing to define a combustion air inlet passage and a combustion air outlet passage, said combustion air inlet passage communicating with the ambient air surrounding said housing and said combustion air outlet passage communicating with the air intake of a carburetor; a first pressure reducing valve disposed within said cylindrical baffle and connected to a fuel inlet mounted on said housing and connected to said source; and a heat exchanger disposed in said combustion air inlet passage, said heat exchanger being connected intermediate said first pressure reducing valve and a fuel outlet mounted on said housing and connected to said carburetor below said intake for reducing the temperature of said combustion air as it flows through said combustion air inlet passage and for supplying the latent heat of vaporization to said liquefied fuel as it flows through said heat exchanger.

5. In a apparatus for vaporizing liquefied fuel and mixing it with air, the combination of: a source of liquefied fuel; a vertically walled housing incorporating a chamber having a cylindrical baffle secured therein and spaced from the wall of said housing to define combusiton air inlet passage and combustion air outlet passage, said combustion air inlet passage communicating with the ambient air surrounding said housing and said combustion outlet passage communicating with the air intake of a carburetor; a first pressure reducing valve disposed within said cylindrical baffle and connected to a fuel inlet mounted on said housing and connected to said source; a second pressure reducing valve mounted externally on said housing and communicating with a fuel outlet on said housing connected to said carburetor below said intake; and a heat exchanger disposed in said combustion air inlet passage, said heat exchanger being connected intermediate said first pressure reducing valve and said second pressure reducing valve for reducing the temperature of said combustion air as it flows through said combustion air inlet passage and for supplying the latent heat of vaporization to said liquefied fuel as it flows through said heat exchanger.

6. In a heat exchange apparatus for a liquefied fuel carburetor, the combination of: a vertically walled housing incorporating a chamber having a cylindrical baffle secured therein and spaced from the wall of said housing to define a combustion air inlet passage and a combustion air outlet passage, said combustion air inlet passage communicating with the ambient air surrounding said housing and said combustion air outlet passage communicating with the air intake of said carburetor; a first pressure reducing valve disposed within said cylindrical baffle and connected to a fuel inlet mounted on said housing; a second pressure reducing valve mounted externally on said housing and communicating with a fuel outlet on said housing, said first and second pressure reducing valves disposed on opposite sides of a common atmospheric chamber; and a heat exchanger disposed in said combustion air inlet passage, said heat exchanger being connected intermediate said first pressure reducing valve and said second pressure reducing valve for reducing the temperature of said combustion air as it flows through said combustion air inlet passage and for supplying the latent heat of vaporizaiton to said liquefied fuel as it flows through said heat exchanger.

7. In a heat exchange apparatus for a liquefied fuel carburetor, the combination of: a vertically walled housing incorporating a chamber having a cylindrical baffle secured therein and spaced from the wall of said housing to define a combustion air inlet passage and a combustion air outlet passage, said combustion air inlet passage communicating with the ambient air surrounding said housing and said combustion air outlet passage communicating with the air intake of said carburetor; a first pressure reducing valve disposed within said cylindrical baffle and connected to a fuel inlet mounted on said housing; a second pressure reducing valve mounted externally on said housing and communicating with a fuel outlet on said housing, said first and second pressure reducing valves disposed on opposite sides of a common atmospheric chamber disposed therebtween; and a heat exchanger disposed in said combustion air inlet passage, said heat exchanger being connected intermediate said first pressure reducing valve and said second pressure reducing valve for reducing the temperature of said combustion air as it flows through said combustion air inlet passage and for supplying the latent heat of vaporization to said liquefied fuel as it flows through said heat exchanger.

8. In a heat exchange apparatus for a liquefied fuel carburetor, the combination of: a vertically walled housing incorporating a chamber having a cylindrical baffle secured therein and spaced from the wall of said housing to define a combustion air inlet passage and a combustion air outlet passage, said combustion air inlet passage communicating with the ambient air surrounding said housing and said combustion air outlet passage communicating with the air intake of said carburetor; a first pressure reducing valve disposed within said cylindrical baffle and connected to a fuel inlet mounted on said housing, said first pressure reducing valve having heat transfer means mounted thereupon; and a heat exchanger disposed in said air inlet passage, said heat exchanger being connected intermediate said first pressure reducing valve and a fuel outlet mounted on said housing for reducing the temperature of said combustion air as it flows through said combustion air inlet passage and for supplying the latent heat of vaporization to said liquefied fuel as it flows through said heat exchanger.

9. In an apparatus for vaporizing liquefied fuel and mixing it with air, the combination of: a source of liquefied fuel; a housing having a combustion air inlet passage and a combustion air outlet passage communicating with each other, said combustion air inlet passage communicating with the ambient air surrounding said housing and said combustion air outlet passage communicating with the air intake of a carburetor; a first pressure reducing valve mounted on said housing and communicating with a fuel inlet on said housing connected to said source; a second pressure reducing valve mounted on said housing and communicating with a fuel outlet on said housing connected to said carburetor below said intake, said first and second reducing valves disposed on opposite sides of a ocmmon atmospheric chamber; a heat exchanger disposed in said combustion air inlet passage, said heat exchanger being connected intermediate said first and second pressure reducing valves on said housing for reducing the temperature of said combustion air as it flows through said combustion air inlet passage and for supplying the latent heat of vaporization to said liquefied fuel as it flows through said heat exchanger; and a regulator mounted adjacent the fuel outlet for regulating the pressure of the fuel as it leaves said outlet.

10. In an apparatus for vaporizing liquefied fuel and mixing it with air, the combination of: a source of liquefied fuel; a vertically walled housing incorporating a chamber having a cylindrical baffle secured therein and spaced from the wall of said housing to define a combustion air inlet passage and a combustion air outlet passage, said combustion air inlet passage communicating with the ambient air surrounding said housing and said combustion air outlet passage communicating with the air intake of a carburetor; a first pressure reducing valve disposed within said cylindrical baffle and connected to a fuel inlet mounted on said housing connected to said source; a second pressure reducing valve mounted externally on said housing and communicating with a fuel outlet on said housing connected to said carburetor below sad intake; a heat exchanger disposed in said combustion air inlet passage, said heat exchanger being connected intermediate said first pressure reducing valve and said second pressure reducing valve for reducing the temperature of said combustion air as it flows through said combustion air inlet passage and for supplying the latent heat of vaporization to said liquefied fuel as it flows through said heat exchanger; and a regulator mounted adjacent the fuel outlet for regulating the pressure of the fuel as it leaves said outlet.

References Cited in the file of this patent

UNITED STATES PATENTS

| | | |
|---|---|---|
| 2,023,809 | Heller | Dec. 10, 1935 |
| 2,105,433 | Noble | Jan. 11, 1938 |
| 2,143,194 | Holzapfel | Jan. 10, 1938 |
| 2,279,530 | Smith | Apr. 14, 1942 |
| 2,475,087 | Ensign et al. | July 5, 1949 |

FOREIGN PATENTS

| | | |
|---|---|---|
| 624,688 | Great Britain | June 15, 1949 |
| 640,995 | Germany | Jan. 22, 1937 |